United States Patent [19]

Iwase et al.

[11] Patent Number: 4,651,577

[45] Date of Patent: Mar. 24, 1987

[54] AUTOMATIC TRANSMISSION STRUCTURE

[75] Inventors: Yoshinobu Iwase, Toyokawa; Kunio Morisawa, Okazaki, both of Japan

[73] Assignees: Aisin Seiki Kabushiki Kaisha; Toyota Jidosha Kabushik Kaisha, both of Aichi, Japan

[21] Appl. No.: 705,724

[22] Filed: Feb. 26, 1985

[30] Foreign Application Priority Data

Mar. 21, 1984 [JP] Japan .............................. 59-038986[U]

[51] Int. Cl.$^4$ .......................... F16H 37/00; F16H 5/40
[52] U.S. Cl. ....................................... 74/12; 74/752 C
[58] Field of Search ........... 74/12, 606 R, 645, 752 R, 74/752 C

[56] References Cited

U.S. PATENT DOCUMENTS

| 1,539,531 | 5/1925 | Adair, Jr. | 74/12 |
| 1,540,395 | 6/1925 | Henry | 74/12 |
| 2,951,391 | 9/1960 | Kolbe | 74/12 |
| 3,164,034 | 1/1965 | Kelly | 74/645 |
| 3,165,946 | 1/1965 | Wayman | 74/752 C |
| 3,554,056 | 1/1971 | Cole | 74/645 |

OTHER PUBLICATIONS

*Mitchell Manuals, Inc.* "Imported Car Transmission Manual" pp. 2-80, 2-110, 2-117, 5-17, 5-18, 2-127, 2-134; 1980.
*Design Practices–Passenger Car Auto. Trans.* SAE p. 360, 1973.
*Automotive Drive Trains* Thiessen and Dales p. 106, 1984.
*Automatic Transmission* Thiessen and Dales pp. 9, 241, 251 and 259, 1984.
Torqueflite Transmission, pp. 21–33, FIG. 1; Title: 1977 Chrysler Plymouth Dodge Chassis–Body Service Manual; published by Chrysler Corporation.
Automatic Transmission, p. 2C-3, FIG. 2C-2; Title: 1981 Technical Service Manual Jeep CH-5, CJ-7 Cherokee Wagoneer Truck; published by American Motors Corporation.

*Primary Examiner*—Lawrence Staab
*Attorney, Agent, or Firm*—Burns, Doane, Swecker & Mathis

[57] ABSTRACT

An automatic transmission includes a parking gear spline connected with an output shaft of the transmission, a plurality of governor valves mounted on the rear side of the parking gear and radially disposed around the output shaft axis, a speed meter drive gear which is spline-connected with the output shaft at the rear of the governor valves, and an annular spacer fitted on the output shaft between the governor valves and the speed meter drive gear.

3 Claims, 1 Drawing Figure

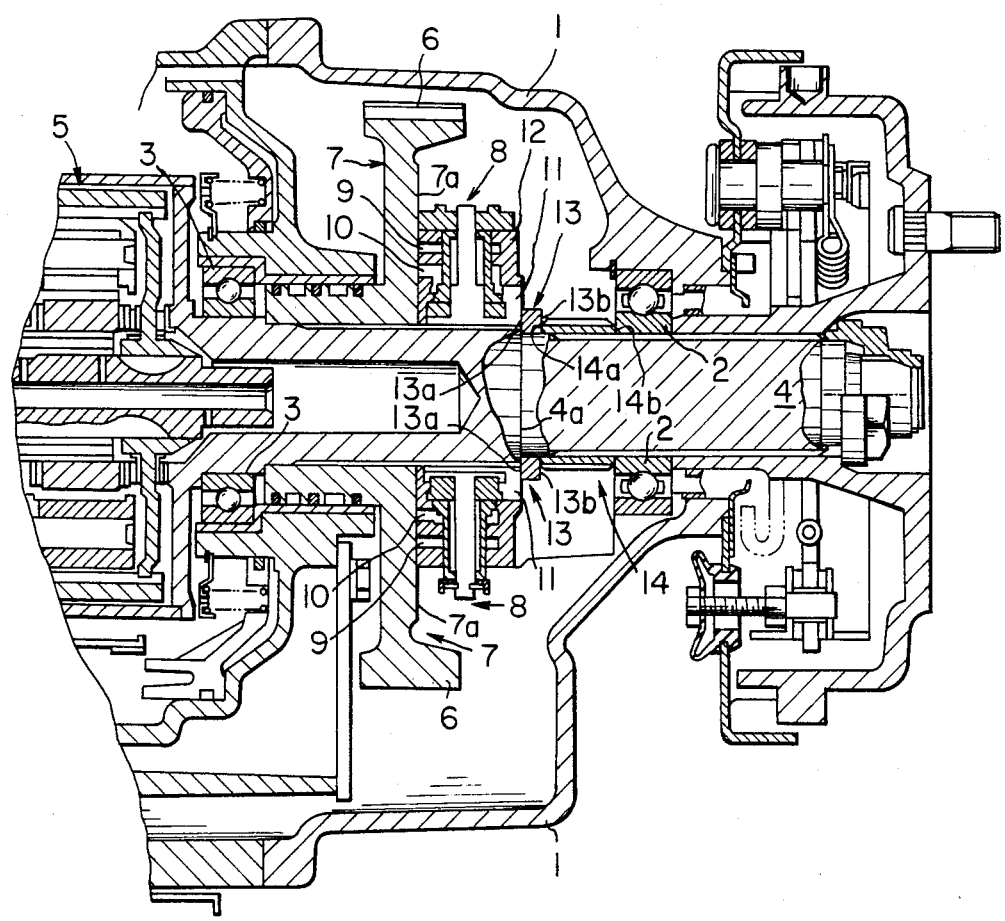

AUTOMATIC TRANSMISSION STRUCTURE

BACKGROUND

The present invention relates to a structure of an automatic transmission and more particularly to an arrangement around a speed meter drive gear mounted on an output shaft of an automatic transmission for vehicles.

A conventional automatic transmission for vehicles is known in which a governor support, a governor valve and a speed meter drive gear are spline-connected with an output shaft serially rearward thereon (for example, in U.S. Pat. No. 3,165,946).

In such a type of the transmission, a parking gear is provided along outer periphery of the governor support. When a parking lever is actuated, a pawl which is operatively connected with the parking lever is brought into engagement with the parking gear to lock the output shaft.

In such a serial arrangement of the parking gear, the governor valve and the speed meter drive gear, however, a large thrust force may occur in an axial direction of the output shaft due to engagement of the pawl with the parking gear on actuation of the parking lever. This would, on the one hand, readily cause the body of the governor valve to be damaged, concavely recessed or deformed resulting in so called valve stick by the gear teeth of the speed meter drive gear in a conventional structure in which a contact area of the governor valve with the speed meter drive gear is small. On the other hand, this would result in shifting of the governor support along the axis of the output shaft together with the governor valve to cause oil leakage at the oil seal portion in the oil supply lines for the governor valve.

SUMMARY OF THE INVENTION

It is therefore an object of the present invention to provide a novel automatic transmission.

It is another object of the present invention to provide an automatic transmission in which the drawbacks in the prior art can be eliminated to avoid the damages on the governor valve for positively performing the inherent governor valve function.

Other objects will become apparent in the entire disclosure.

In accordance with the present invention, a speed meter drive gear is prevented from directly abutting on a governor valve to avoid such damages on the governor valve. Namely, a parking gear is spline-connected with an output shaft of a transmission; a plurality of governor valves mounted on the rear of the parking gear are radially provided around the axis of the output shaft; a speed meter drive gear is spline connected with the output shaft at the rear of the governor valves; and an annular spacer having a contact area with the governor valves larger than the front end face of the speed meter drive gear is interposed between the governor valve and the speed meter drive gear.

In such arrangement, when a pawl which is operatively connected with a parking lever is brought into engagement with a parking gear upon operation by an operator, thrust force is generated in an axial direction of the output shaft by the engagement force of the gears whereupon the parking gear will force the governor valves to urge rearwardly via the governor support. However, the resulting biasing force is transmitted to the speed meter drive gear via the spacer, wherein the gear end face (front end face) of the speed meter drive gear will not directly abut against the governor valve.

Therefore, the gear teeth on the outer periphery of the speed meter drive gear will not bite the governor valves so as to prevent the governor valves from being damaged.

In accordance with the present invention, since the annular spacer is fitted on the output shaft between the governor valve and the speed meter drive shaft, a thrust force which is applied on the governor valve from the parking gear will be uniformly received and absorbed by the spacer. Accordingly, the gear teeth of the speed meter drive gear disposed at the opposite side of the spacer will not abut against the governor valve. Therefore, the damages upon the governor valve may be positively avoided, ensuring the proper performance of the inherent funcions of the governor valve.

Since the spacer formed as a separate body from the speed meter drive gear is incorporated, gear fabrication of the speed meter drive gear is easier in comparison with the case where the front end face of the speed meter drive gear would be designed to provide a similar spacer function. The spacer may be mass produced at a low cost by pressing due to its simple structure. Besides, there is another effect that the space occupied by the spacer does not unduly restrict the internal space of the transmission.

BRIEF DESCRIPTION OF THE DRAWING

A single FIGURE is a sectional view showing an embodiment of the present invention.

DETAILED DESCRIPTION OF THE PREFERRED EMBODIMENTS

The present invention will be described by way of an embodiment with reference to the drawing which is disclosed for illustrative purposes only and not for any limitative purpose of the present invention. A single FIGURE shows an arrangement around an output shaft of an automatic transmission for vehicles.

A planetary gear set 5 is provided in front of an output shaft 4 which is supported by bearings 2 and 3 against a housing 1. The output shaft 4 is spline-connected with a parking gear 6 at the rear thereof.

A flange-shaped arm portion (7) of the parking gear 6 provides a governor support 7 for a governor valve 8 which is disposed at the rear side 7a of the arm portion (7). Oil is supplied to and discharged from the governor valve 8 via oil passages (not shown) formed in the governor support 7, the oil passages being connected with supply ports 9 and outlet ports 10, respectively. In the FIGURE, the reference numeral 11 represents drain ports.

At a stepped portion 4a of the output shaft 4 to which the valve body is mounted at the bottom thereof, an annular spacer 13 is fitted around the output shaft 4 so that the front side 13a of the spacer 13 abuts on the side of the stepped portion or shoulder 4a. A speed meter drive gear 14 is spline engaged with the output shaft 4 at the rear of the spacer 13 so that the front end face 14a of the drive gear 14 abuts on the rear side 13b of the spacer 13. The rear end face 14b of the speed meter drive gear 14 abuts on the bearing 2 so that the bearing 2 and the shoulder 4a of the output shaft 4 enable a fixed axial positioning of the spacer 13 and the speed meter drive gear 14.

In this embodiment, the spacer has the dimensions: 2.5 mm longitudinal thickness, 15 mm inner dia. and 47 mm outer dia. The outer diameter of the spacer 13 is designed to be larger than that of the speed meter drive gear 14. The spacer 13 is made of, for example, SPCC iron plate which can be press-formed.

As having arranged in such a manner, the governor support 7 and the governor valve 8 tend to move in an axial direction if a larger engagement force is exerted onto the parking gear 6 upon operation of a parking brake. The resulting thrust force is, however, uniformly received and absorbed by the spacer 13 since the front end face 13a of the spacer 13 having a wide contact area abuts against the rear side of the governor valve body 12.

Accordingly, the speed meter drive gear 14 is prevented from biting the governor valve 12 with the front face 14a thereof, thus causing no damages onto the valve body 12.

The contact area or outer diameter of the spacer applied in the present invention to the valve body is preset in such a manner that the spacer is prevented from completely closing the drain port of the valve body when the spacer is fitted on the output shaft.

Modifications apparent in the art may be made without departing from the gist and scope of the present invention as herein disclosed and claimed hereinbelow.

What is claimed is:

1. An automatic transmission comprising:
   an output shaft of said transmission including a stepped portion,
   a parking gear spline-connected with said output shaft on a first side of said stepped portion,
   a plurality of governor values mounted on a rear side of said parking gear and radially disposed around said output shaft on said first side of said stepped portion,
   a speed meter drive gear spline-connected with said output shaft on a second side of said stepped portion and on a rear side of said governor valves, and
   an annular spacer fitted on said output shaft on said second side of said stepped portion between said governor valves and said speed meter drive gear to abut on each of said governor valves and said speed meter drive gear, said annular member being constructed separately from said speed meter drive gear and having an outer diameter larger than an outer diameter of said speed meter drive gear thereby resulting in a contact area between said annular spacer and said speed meter drive gear which is smaller than a contact area between said annular spacer and said rear side of said governor valves,
   said drive gear being axially secured relative to said output shaft by a bearing thereby enabling a fixed axial positioning of said annular spacer on said output shaft.

2. The transmission as defined in claim 1, wherein said governor valves have drain ports in said rear sides thereof, and said outer diameter of said annular spacer does not extend completely over said drain ports of said governor valves.

3. An automatic transmission comprising:
   an output shaft having a relatively large diameter section, a relatively small diameter section, and a stepped portion, said stepped portion having a side surface formed by the transition of the output shaft from said large diameter section to said small diameter section,
   a parking gear having a front side and a rear side, said parking gear being spline-connected with said large diameter section of said output shaft,
   a plurality of governor valves mounted on said rear side of said parking gear and radially disposed around said large diameter section of said output shaft, said governor valves having rear sides facing in substantially the same direction as said rear side of said parking gear,
   a speed meter drive gear spline-connected with said small diameter section of said output shaft and positioned axially along said output shaft from said rear sides of said governor valves, said speed meter drive gear having a front end surface facing said rear sides of said governor valves,
   an annular spacer having an inner diameter and an outer diameter, said annular spacer being fitted on said small diameter section of said output shaft between said governor valves and said speed meter drive gear,
   said annular spacer further comprising a front side abutting said side of said stepped portion and covering a portion of said rear sides of said governor valves, thereby forming a first contact area and a rear side abutting said front end surface of said speed meter drive gear thereby forming a second contact area, said first contact area being larger than said second contact area,
   a bearing supporting said output shaft and axially securing said speed meter drive gear from axial movement relative to said output shaft, thereby ensuring a fixed axial positioning of said annular spacer on said output shaft.

* * * * *